(12) United States Patent
Berger et al.

(10) Patent No.: US 7,766,126 B2
(45) Date of Patent: Aug. 3, 2010

(54) THERMAL VALVE ASSEMBLY STAND TUBE

(75) Inventors: Todd R. Berger, Ann Arbor, MI (US);
Steven A. Coleman, Westland, MI (US);
Derril A. Loe, Williamston, MI (US);
Bradley A. Buczkowski, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1035 days.

(21) Appl. No.: 11/462,109

(22) Filed: Aug. 3, 2006

(65) Prior Publication Data

US 2008/0047394 A1 Feb. 28, 2008

(51) Int. Cl.
*F16H 57/04* (2010.01)
*F01M 11/06* (2006.01)

(52) U.S. Cl. ............... 184/6.12; 184/1.5; 184/11.3; 74/606 R; 137/468; 137/576

(58) Field of Classification Search ......... 74/606 R, 74/606 A; 137/265, 468, 572, 576, 599.11; 180/339; 184/6.22, 6.23, 7.3, 11.1, 13.1; 210/167.08, 254

See application file for complete search history.

(56) References Cited

U.S. PATENT DOCUMENTS

| | | | | |
|---|---|---|---|---|
| 1,225,840 A | * | 5/1917 | Mayer et al. ............... 184/6.5 |
| 1,591,391 A | * | 7/1926 | Lundberg ................. 74/421 R |
| 2,695,679 A | * | 11/1954 | Hoffman et al. ............ 96/205 |
| 2,743,627 A | * | 5/1956 | Christeuson ............. 74/606 R |
| 3,618,711 A | * | 11/1971 | Vollmer .................... 184/6.12 |
| 3,800,913 A | * | 4/1974 | Schmitt .................... 184/6.13 |
| 4,217,926 A | * | 8/1980 | Van Gorder ................ 137/389 |
| 5,130,014 A | * | 7/1992 | Volz .......................... 210/130 |
| 5,499,908 A | * | 3/1996 | Schmitz, III ............... 417/368 |
| 6,876,797 B2 | * | 4/2005 | Morris ...................... 385/100 |

* cited by examiner

*Primary Examiner*—Richard W Ridley
*Assistant Examiner*—Thomas Diaz
(74) *Attorney, Agent, or Firm*—Quinn Law Group, PLLC

(57) ABSTRACT

An integral stand tube for regulating fluid level within a transmission is provided. The stand tube includes an upper opening, at least one lower opening, and an internal volume defined by at least one internal passage for directing fluid from a valve body-side of a transmission to a main sump located on a gear-side of the transmission. The lower opening is operatively connected to a thermal valve assembly and a fluid passage formed in the transmission case between the auxiliary sump of the valve body-side and the main sump of the gear-side. Fluid passing from auxiliary sump to main sump bypasses dynamic transmission components to thereby minimize fluid aeration due to contact therebetween.

11 Claims, 3 Drawing Sheets

THERMAL VALVE ASSEMBLY STAND TUBE

TECHNICAL FIELD

The present invention relates to an apparatus for regulating a fluid level within a valve-body side portion of a vehicular transmission.

BACKGROUND OF THE INVENTION

Pressurized oil or transmission fluid performs various functions within an automatically shiftable vehicle transmission. The fluid may act as a coolant to regulate transmission temperature, as a lubricant to reduce frictional wear of dynamic components, and/or as a medium for transmitting mechanical force, such as in the example of a hydraulically-activated clutch pack. Transmission fluid is primarily stored in a main reservoir or sump located within a gear-side portion of a transmission case. From the sump, liquid is drawn through an inlet tube for fluid communication to a hydraulic pump, the pump then pressurizing and circulating the transmission fluid to various areas and components within the vehicle transmission. Two such transmission components are the transmission valve body assembly and the thermal valve assembly.

A transmission valve body assembly contains an array of internal fluid passages or channels for directing pressurized transmission fluid to a variety of components operatively connected within the transmission case, such as valves. In particular, thermal valves are commonly used to regulate fluid levels that may rise due to thermal expansion, and are often positioned on the valve body-side of a transmission case beneath the valve body assembly. The thermal valve assembly is disposed within an opening, orifice, or passage leading from an auxiliary sump volume of the valve body-side of the case and the main sump volume located on the gear-side portion of the case. The thermal valve assembly actuates or cycles when heated, thereby closing and sealing off the fluid passage connecting the auxiliary sump portion to the main sump. Because this fluid passage is closed, transmission fluid levels gradually rise within the volume of the valve body-side portion until that side of the case is nearly full.

When rising transmission fluid levels reach the top of the valve body-side portion of the transmission case, the fluid will escape or exit through any available port or orifice, such as a fluid exit passage or gate in the case wall typically positioned above the valve body. After the overflow fluid passes to the gear-side portion of the transmission case and makes its way into the main sump, the fluid may incidentally contact various moving or dynamic transmission drive components, such as chains, belts, or planetary gear sets and their constituent gear elements. The combination of fluid motion and contact with the dynamic drive components may produce fluid aeration, or the entrainment of tiny air pockets or bubbles within the fluid.

SUMMARY OF THE INVENTION

Accordingly, an apparatus is provided for regulating the level of fluid within a transmission having a gear-side portion with a main sump volume and a valve body-side portion with an auxiliary sump volume, the apparatus comprising a stand tube having an enclosed volume, a top opening/inlet, and a bottom opening/outlet. The lower outlet of the stand tube is in fluid communication with an auxiliary sump volume in the valve body-side portion of the case through a fluid passage formed in the wall of the transmission case, through which the fluid passes into the main sump volume within the gear-side of the case. In this manner, contact and resulting aeration is minimized between the fluid and dynamic components located on the gear-side of the transmission.

In one aspect of the invention, a thermal valve assembly within the auxiliary sump is operable to selectively communicate fluid from the auxiliary sump to the main sump irrespective of fluid communication from the stand tube.

In another aspect of the invention, at least one side wall of the stand tube is shaped to substantially conform to the wall or walls of the transmission case, with the sidewall being constructed of temperature-resistant molded nylon.

In another aspect of the invention, the stand tube comprises two internal fluid passages, wherein the first passage has an upper inlet and a lower outlet, and the second passage has an upper inlet positioned below both the upper inlet of the stand tube and the upper inlet of the first passage, and further has a lower inlet positioned within or in proximity to the auxiliary sump to allow fluid to enter the second passage from the bottom.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
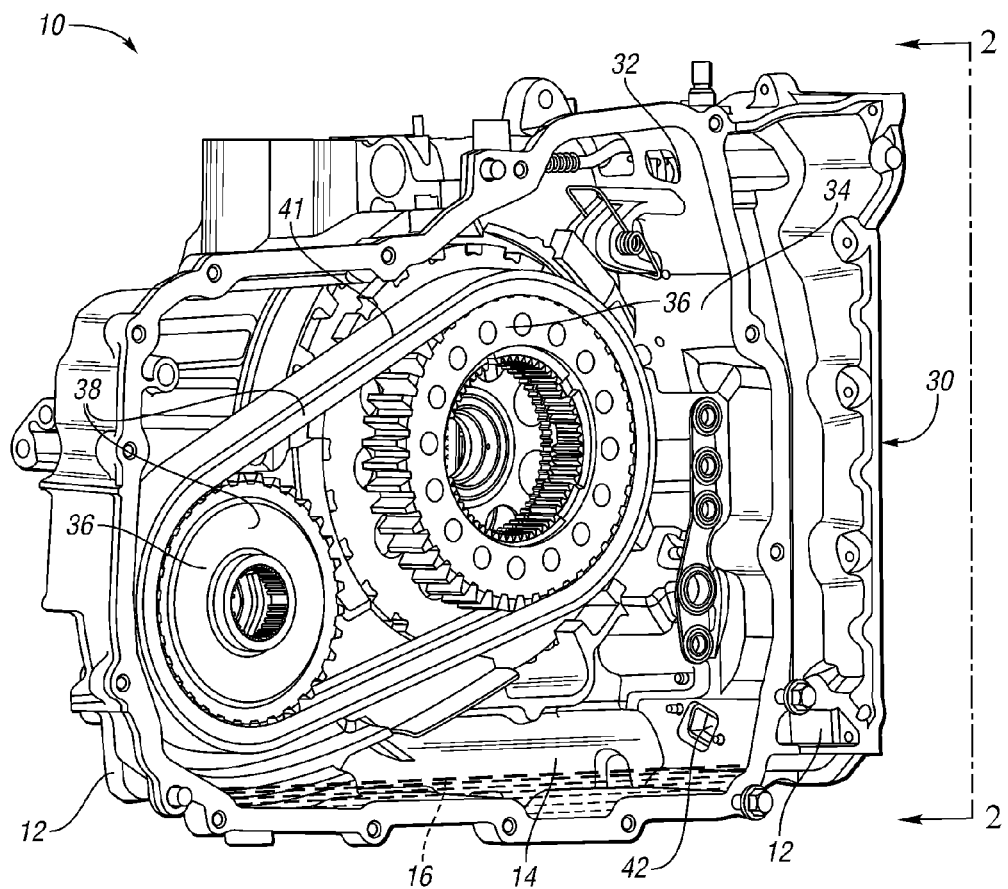
FIG. 1 is a perspective view of a portion of a transmission case showing dynamic transmission components in the gear-side portion of the case.

Referring to the drawings wherein like reference numbers correspond to like or similar components throughout the several figures, there is shown in FIG. 1 an automatically shiftable transmission 10 having a cast transmission housing or case 12. The case 12 at least partially defines a gear-side portion 34 as shown and a valve body-side portion 30 of the transmission case (see FIGS. 2 and 3). The gear-side 34 has a main reservoir or sump volume 14 within which a quantity of oil or transmission fluid 16 may be collected. A hydraulic pump (not shown) draws fluid 16 from the main sump 14, then pressurizes and communicates the fluid to various components within the transmission 10. The gear-side 34 of the case 12 further contains various dynamic transmission components 38, represented in FIG. 1 as two rotatable gears 36 drivably connected by a drive belt 41, but which could also take the form of, for example, a combination of various other gear sets, chains, belts, or rotatable shafts. An upper fluid opening or gate 32 is positioned near the top of the gear-side 34 of the case 12 and permits fluid 16 to flow or pass from valve body-side 30 to gear-side 34 as needed. Likewise, a lower fluid opening or gate 42 is positioned near the bottom of the gear-side 34 of the case 12 and permits fluid 16 to flow or pass from the valve body-side 30 into the gear-side 34 of the case as may be needed.

Figure 2:
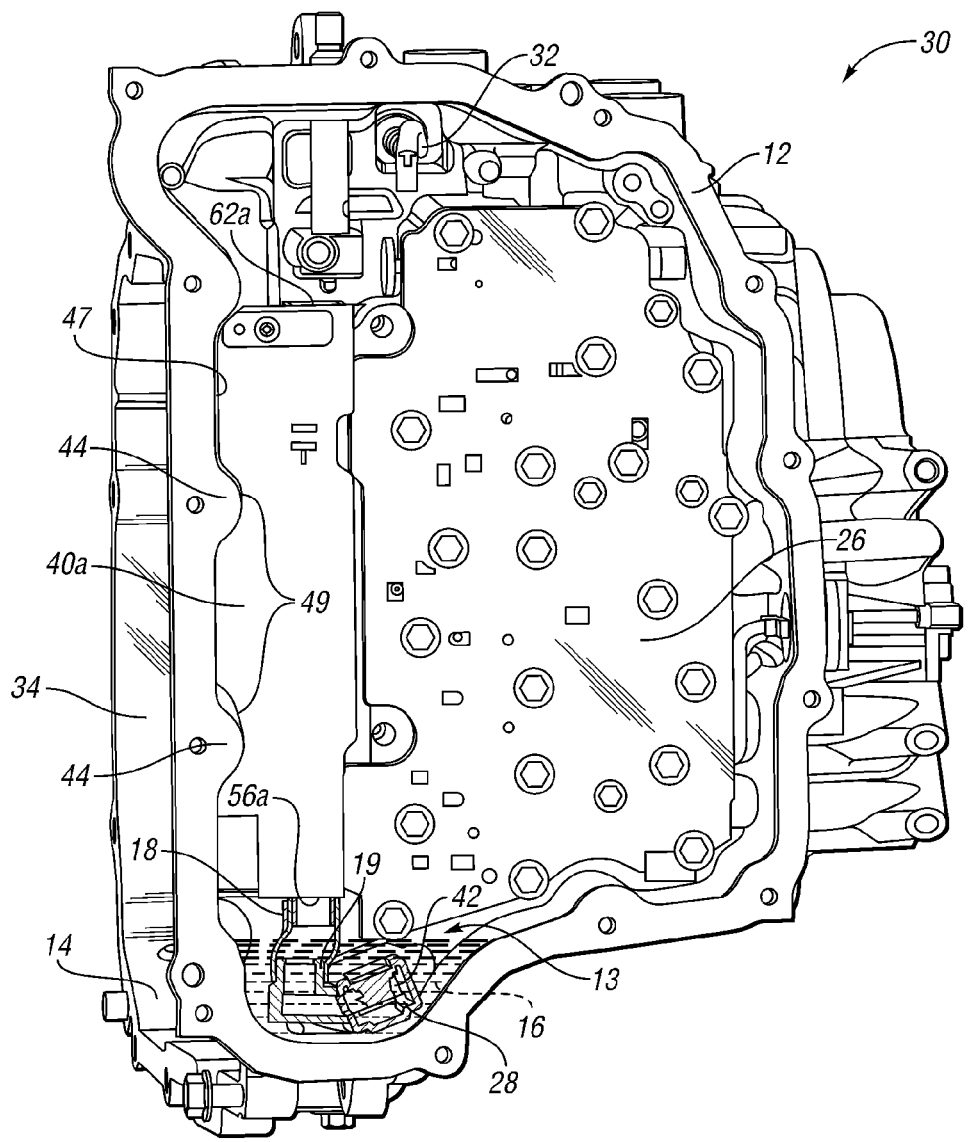
FIG. 2 is a side view taken at line 2-2 of FIG. 1 of the valve body-side portion of a transmission case showing a valve body and stand pipe.

With reference to FIG. 2, there is shown a side view of the transmission 10 taken in the direction of line 2-2 of FIG. 1 and illustrating the internal configuration of the valve body-side portion 30 of case 12 of the transmission. A side cover (not shown) is removably mounted to the valve body-side 30 of case 12 to form an enclosed volume around the valve body assembly 26. Those skilled in the art of transmission design will recognize that the valve body assembly 26 may include a plurality of valves operable to control torque-transmitting engagement as well as selectively provide pressurized fluid to other components within the transmission. Within the valve body-side portion 30 of the transmission case 12 is a thermal valve assembly 28 mounted in a generally orthogonal relation to the case 12 such that the thermal valve assembly 28 is positioned generally horizontally within the auxiliary sump volume 13. The thermal valve assembly 28 includes an opening 29 which permits fluid 16 in the auxiliary sump 13 to fluidly communicate with the main sump 14, in accordance with the operation of the thermal valve assembly. When the transmission 10 is operating, fluid 16 is exhausted or descends from the valve body assembly 26 into the volume of the auxiliary sump 13. The auxiliary sump 13 gradually fills as fluid 16 enters the auxiliary sump 13 and is not otherwise permitted to be discharged or exhausted through lower fluid gate 42 into the main sump 14 by the thermal valve assembly 28.

As fluid 16 expands and fills the volume within the valve body-side 30 of the case 12, the fluid 16 will, unless discharged by thermal valve 28, eventually reach the level of upper fluid gate 32. While the purpose of upper fluid gate 32 is to allow overflow fluid 16 to pass to the gear-side 30 and eventually to the main sump 14, any fluid 16 flowing or spilling into gear-side 34 through the upper fluid gate 32 may directly contact dynamic transmission components 38 (see FIG. 1), thereby leading to undesirable fluid aeration and the potentially detrimental effects of such aeration as described previously herewithin. Therefore, in accordance with this invention an integral stand tube 40a is provided to divert or direct excessive fluid 16 to and through lower fluid gate 42 before the fluid reaches the level of upper fluid gate 32. Stand tube 40a has a top inlet 62a and a bottom outlet 56a. When the fluid 16 rises to the level of top inlet 62a, the fluid enters stand tube 40a and flows or drains through to bottom outlet 56a. Bottom outlet 56a is in fluid communication with the lower fluid gate 42 (FIG. 4), either directly or via a shared connection with a thermal valve 28 as described hereinafter, to thereby allow fluid 16 to pass or spill directly into the main sump 14 of gear-side 34. In this manner, the stand tube 40a bypasses dynamic components 38 to thereby minimize any undesirable fluid aeration.

In the preferred embodiment, the stand tube 40a is formed of rugged, temperature resistant nylon and molded or configured to conform to the adjacent inside surfaces 47 of the valve body-side 30 of the case 12. However, any suitable material may be used, such as stamped metal, plastic, or an aluminum channel cast within the case 12. In FIG. 2, stand tube 40a is shown formed with concave indentions 49 sized and positioned to fit over transmission bolt wells 44, but those skilled in the art of transmission design will recognize that alternate designs are suitable for use as a stand tube 40a. For instance, one could use a substantially rigid or flexible straight cylindrical tube, or mating metal channels formed or molded into both the case 12 and the removable side cover (not shown) which, when assembled, would connect or combine to define a volume as described for stand tube 40a.

Figure 4:
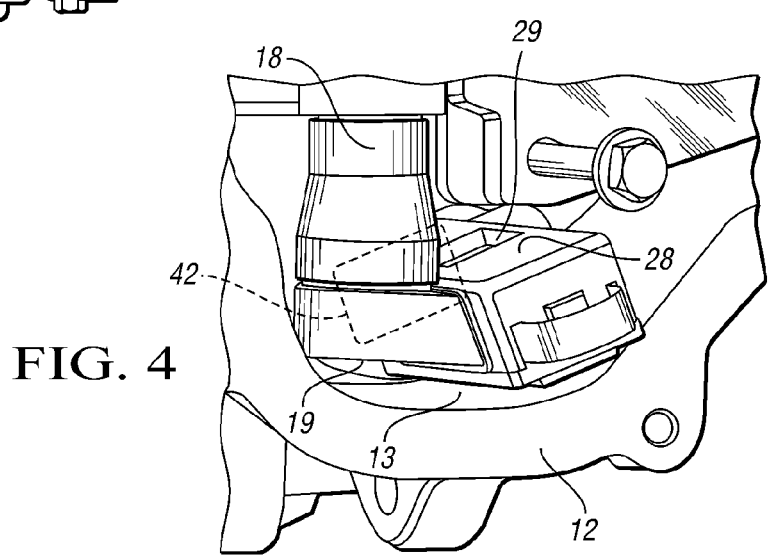
FIG. 4 is a perspective view of the auxiliary sump area or portion of a transmission according to the invention.

When used in conjunction with a thermal valve assembly 28, stand tube 40a is preferably fitted with an integral flange 18 which directly connects to bottom outlet 56a. Likewise, thermal valve assembly 28 is preferably provided with an integral flange 19 that mates up or connects with flange 18 of the stand tube, as shown in FIG. 4. In this manner, stand tube 40a and thermal valve 28 may both connect to and pass fluid to main sump 14 through a single lower fluid gate 42 located in the wall of case 12.

Figure 3:
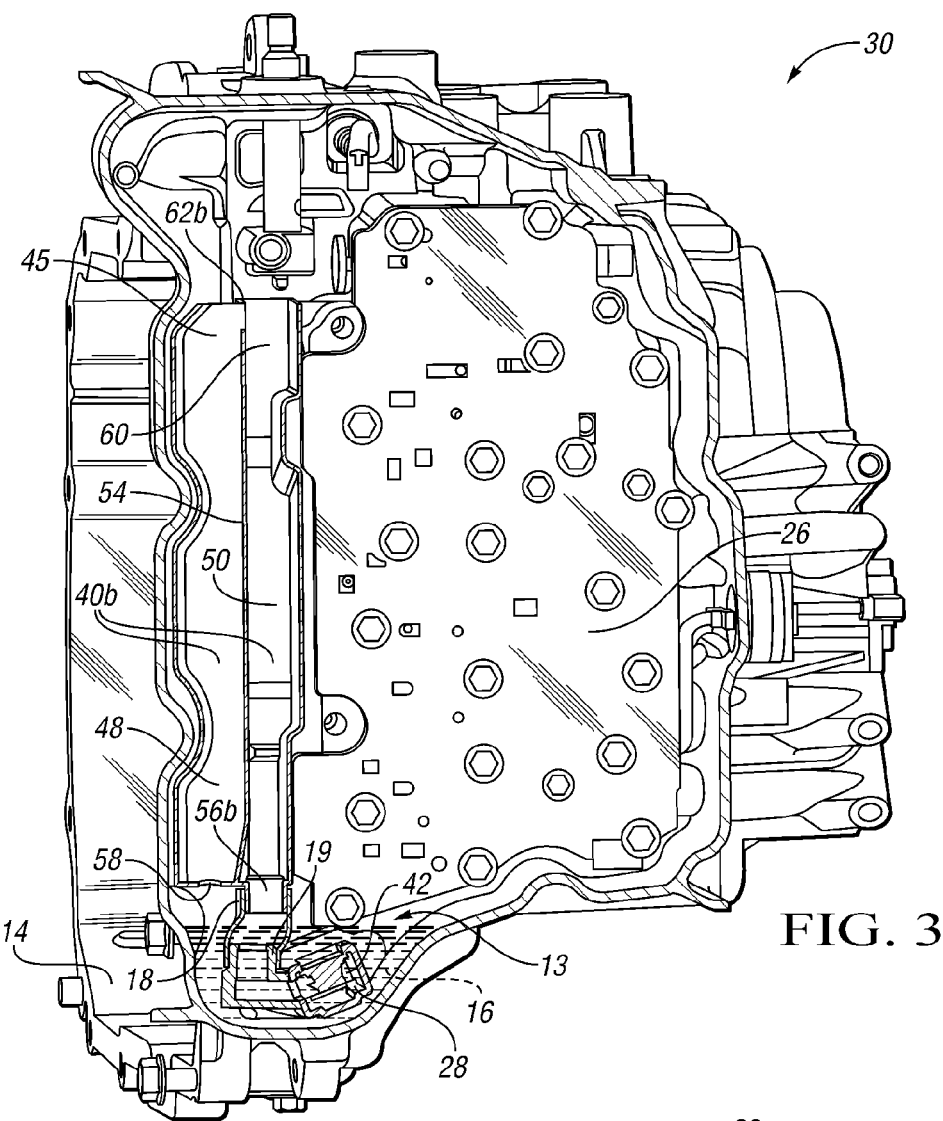
FIG. 3 is a side view taken at line 2-2 of FIG. 1 of the valve body-side portion with a stand pipe with two internal chambers.

In a second embodiment, as shown in FIG. 3, the aeration effect is further reduced by using a multi-chambered stand pipe 40b having a first passage 50 and second passage 48 in parallel with the first passage 50. While nylon construction is preferred, other material may be used, such as plastic, stamped metal, or channels cast within the case as described herewithin. Passages 48, 50 may take the form of tubes, pipes, or any other suitable conduit. Preferably, passages 48, 50 share a common wall 54 to prevent errant fluid bypass between the adjoining passages. The first passage 50 has an outlet 56b in fluid communication with the lower fluid gate 42 through a thermal valve assembly 28 to permit fluid 16 from the first passage 50 to pass through fluid gate 42 into the main sump volume 14. The connection between outlet 56b and lower fluid gate 42 is preferably by way of a mating connector flange functionally similar to flange 18, as shown in FIG. 4.

The second passage 48 of stand tube 40b has a lower inlet 58 located within or in fluid communication with auxiliary sump 13 to allow fluid 16 to enter the second passage from below. Agitation within the case 12 may further aerate fluid 16 and cause foaming or frothing of the fluid. In such a situation, fluid 16 will settle gravitationally at the bottom of auxiliary sump 13 while aerated foam rises to the top. By positioning lower inlet 58 of the second passage 48 within auxiliary sump 13, un-agitated fluid 16 is allowed to rise within the second passage 48, where it will eventually exit through upper outlet 45 and spill over into first passage 50 through inlet 60 and spill or flow downward through first passage 50. Once fluid 16 enters the first passage 50, the fluid will settle gravitationally to the bottom of the first passage before exiting through lower fluid gate 42 and spilling into main sump 14. By following this route, fluid 16 will be diverted from dynamic components 38, thus avoiding or minimizing fluid aeration.

Additionally, inlet portion 60 of first passage 50 allows rising fluid 16 to enter the first passage directly from the valve body-side 30 when fluid levels within the valve body-side are excessive, i.e. reaching the level of the main opening 62b of stand tube 40b. As shown in FIG. 3, main opening or inlet 62b is situated above and substantially spans inlets 45, 60, and further positioned to allow fluid 16 to enter the top of first passage 50 through upper inlet 60. The fluid 16 will settle gravitationally within first passage 50 before passing or discharging through lower fluid gate 42 into main sump 14.

While the best modes for carrying out the invention have been described in detail, those familiar with the art to which this invention relates will recognize various alternative designs and embodiments for practicing the invention within the scope of the appended claims.

The invention claimed is:

1. A transmission having a gear-side with dynamic transmission components lubricatable by a fluid and a valve body-side having a transmission valve body assembly, the transmission comprising:

a case at least partially defining a main sump volume containing the dynamic transmission components and an auxiliary sump volume containing the transmission valve body assembly, the case defining an upper fluid gate near the top of the case and a lower fluid gate near the bottom of the case, wherein the upper fluid gate and the lower fluid gate each allow fluid to flow from the valve body-side of the case to the gear-side of the case; and a stand tube positioned within the case on the valve body-side, and adapted to direct fluid through the lower fluid gate before the fluid reaches the upper fluid gate;

wherein the stand tube defines an internal volume having a top opening in the auxiliary sump volume, and a bottom opening in direct fluid communication with the main sump volume through the lower fluid gate so that the fluid by-passes the dynamic components by passing through the stand tube to the lower fluid gate.

2. The transmission of claim 1, including a thermal valve assembly at least partially disposed within the auxiliary sump volume and operable to selectively communicate fluid from the auxiliary sump volume to the main sump volume through the lower fluid gate irrespective of whether the fluid is communicated from the bottom opening of the stand tube.

3. The transmission of claim 1, wherein at least a portion of the stand tube is configured to substantially conform to an internal profile of the case.

4. The transmission of claim 1, wherein the stand tube is at least partially molded into the case.

5. The transmission of claim 1, wherein the stand tube is constructed at least partially of temperature resistant nylon.

6. A stand tube for a transmission, the transmission having a gear-side with dynamic transmission components that are lubricatable by a fluid, a valve body-side having a transmission valve body assembly, and a case at least partially defining a main sump volume on the gear-side, an auxiliary sump volume on the valve body-side, an upper fluid gate between the gear-side and the valve body-side near a top of the case, and a lower fluid gate between the gear-side and the valve body-side near a bottom of the case, the stand tube defining a plurality of internal fluid passages and at least one sidewall forming an internal volume, a top opening and a bottom opening;

wherein the stand tube is configured to direct fluid from the valve body-side directly to the gear-side through the lower fluid gate before the fluid reaches the upper fluid gate, thereby minimizing contact between the fluid and the dynamic components of the transmission.

7. The stand tube of claim 6, wherein the plurality of internal fluid passages includes:

a first fluid passage having an upper inlet and a lower outlet connected to the lower fluid gate;

a second fluid passage having a lower inlet positioned in the auxiliary sump volume and adapted to allow fluid to enter the second passage from the auxiliary sump volume, and an upper outlet positioned below the upper inlet of the first fluid passage to allow fluid rising within the second passage to thereby enter the first passage; and a main opening positioned above and substantially spanning the upper inlet of the first fluid passage and the upper outlet of the second fluid passage, whereby fluid in the auxiliary sump volume may directly enter the first passage through the main opening.

8. The stand tube of claim 7, wherein the transmission includes a thermal valve assembly, and wherein the stand tube includes a flange operatively connected to the bottom opening, and wherein the lower outlet of the first passage is configured for connection to the lower fluid gate to by-pass the thermal valve assembly disposed between the stand tube and the lower fluid gate to direct the fluid from the auxiliary sump volume to the main sump volume.

9. The stand tube of claim 7, wherein at least one sidewall is configured to substantially conform to the internal profile of the case.

10. The stand tube of claim 7, wherein the stand tube is at least partially molded into the case.

11. The stand tube of claim 7, wherein the stand tube is constructed of temperature-resistant nylon.

* * * * *